Jan. 26, 1926.

J. N. KALKANIS

CANDY MAKING MACHINERY

Filed August 7, 1925

INVENTOR.
JAMES N. KALKANIS
BY
Parker & Burton
ATTORNEY.

Jan. 26, 1926.

J. N. KALKANIS 1,570,748

CANDY MAKING MACHINERY

Filed August 7, 1925   5 Sheets-Sheet 2

INVENTOR.
JAMES N. KALKANIS

Parker &
Burton
ATTORNEY.

Jan. 26, 1926.
J. N. KALKANIS
1,570,748
CANDY MAKING MACHINERY
Filed August 7, 1925
5 Sheets-Sheet 3
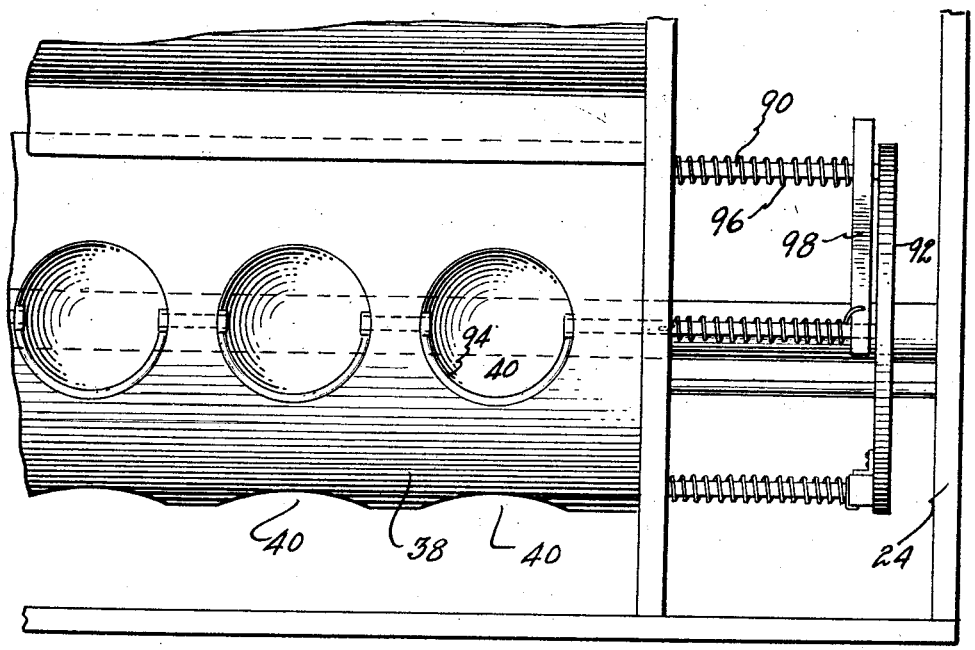
Fig. 3
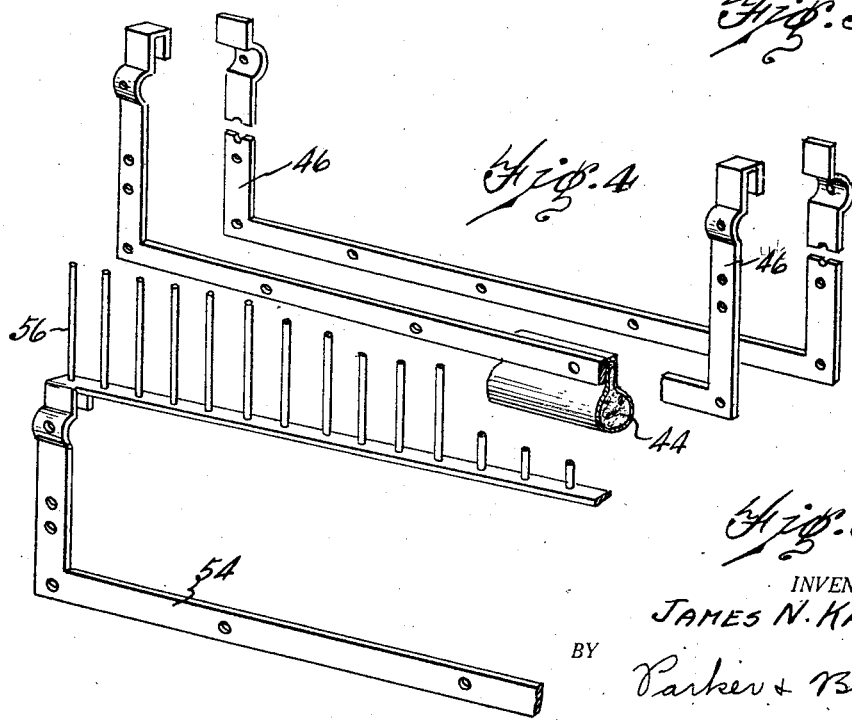
Fig. 4
Fig. 5
INVENTOR.
JAMES N. KALKANIS
BY
Parker & Burton
ATTORNEY.

Jan. 26, 1926.
J. N. KALKANIS
1,570,748
CANDY MAKING MACHINERY
Filed August 7, 1925     5 Sheets-Sheet 4
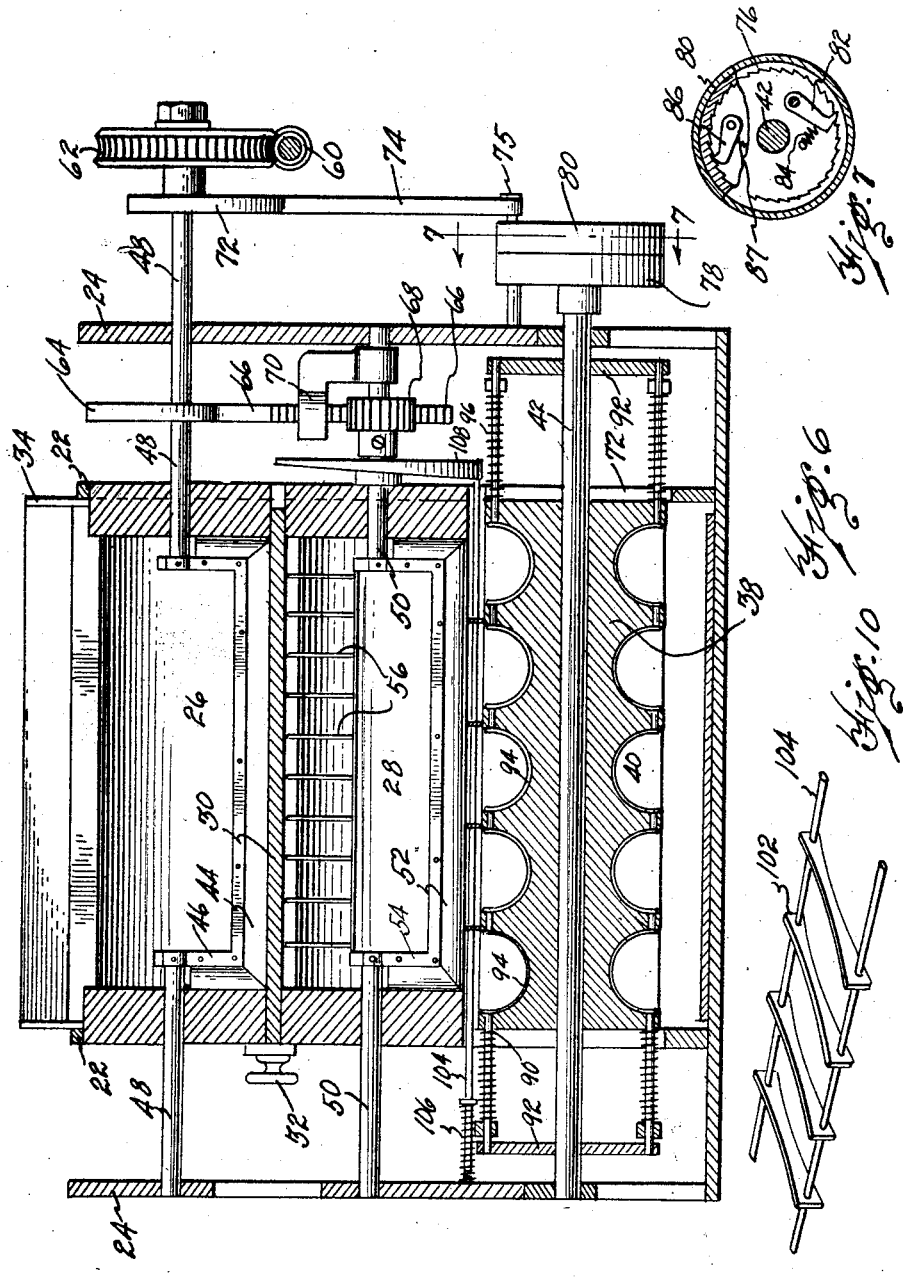
INVENTOR.
JAMES N. KALKANIS
BY Parker & Burton
ATTORNEY.

Jan. 26, 1926.
J. N. KALKANIS
1,570,748
CANDY MAKING MACHINERY
Filed August 7, 1925   5 Sheets-Sheet 5
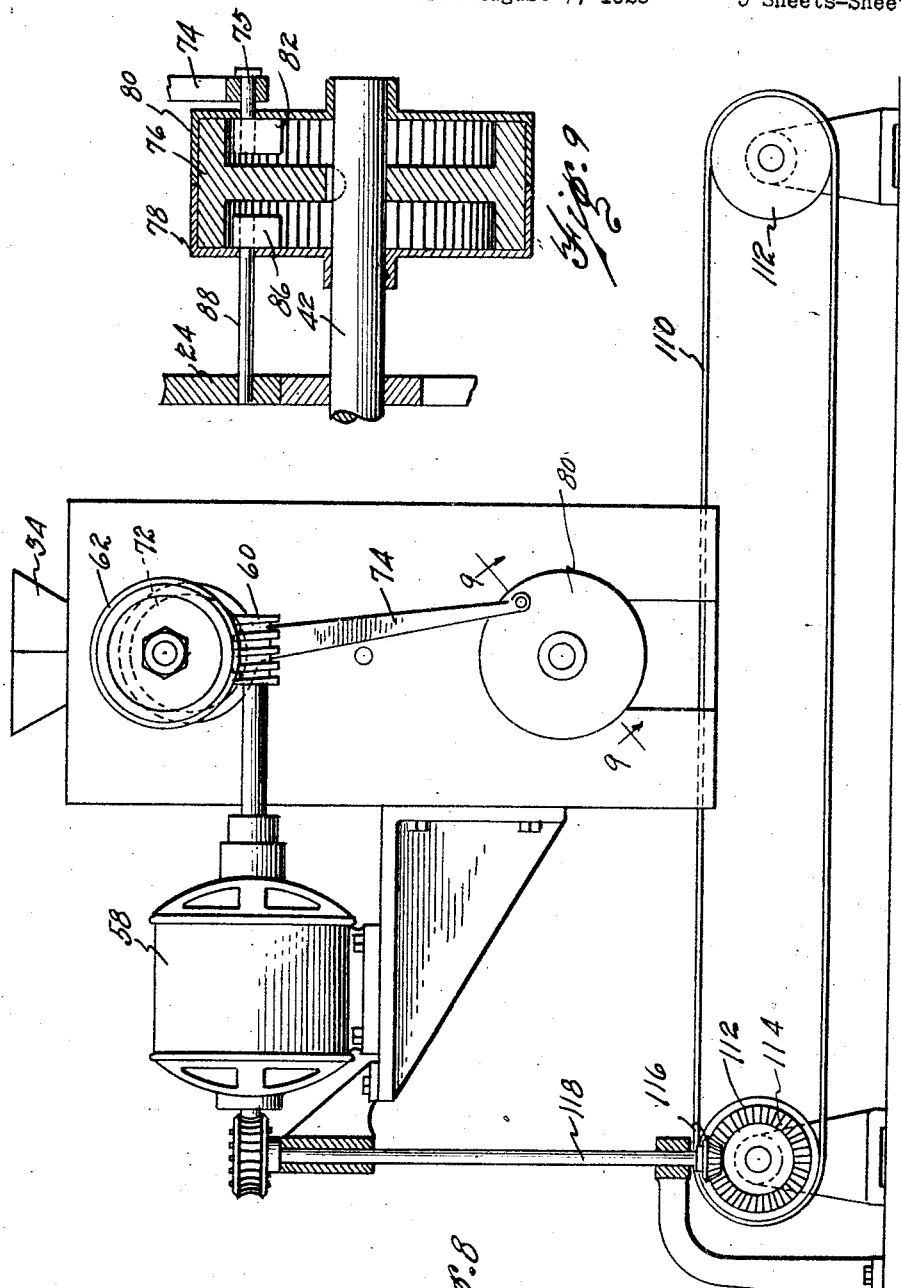
INVENTOR.
JAMES N. KALKANIS
BY Parker + Burton
ATTORNEY.

Patented Jan. 26, 1926.

1,570,748

UNITED STATES PATENT OFFICE.

JAMES N. KALKANIS, OF DETROIT, MICHIGAN.

CANDY-MAKING MACHINERY.

Application filed August 7, 1925. Serial No. 48,722.

*To all whom it may concern:*

Be it known that I, JAMES N. KALKANIS, a citizen of the Republic of Greece, residing at Detroit, county of Wayne, State of Michigan, have invented a certain new and useful Improvement in Candy-Making Machinery, and declare the following to be a full, clear, and exact description of the same, such as will enable others skilled in the art to which it pertains to make and use the same, reference being had to the accompanying drawings, which form a part of this specification.

My invention relates to an improved machine for mixing and molding confection, particularly to the molding of candy nut clusters, which machine is adapted to mix the nuts with the candy binder without breaking the nuts and to mold the nut clusters into the desired shape with great rapidity.

An object is the provision of a machine of the character described having a mixing chamber in which the conglomerate is carefully and thoroughly mixed and discharged into the mold cavities of a rotatable mold carrier to be shaped therein and discharged therefrom, and a meritorious feature is the employment in such a structure of a rotatable mold carrier which normally closes the discharge opening from the mixing chamber and is adapted during its rotation to bring a series of mold cavities successively into position to be filled, and upon further rotation to discharge the molded contents therefrom.

Other important objects and advantages consist in the employment of means adapted to thoroughly mix the conglomerate in the mixing chamber without breaking the nuts and stripping means within the mold cavities adapted to be automatically actuated by the rotation of the mold carrier to loosen the molded contents from the cavities at the proper moment to discharge therefrom, and further to so connect the operating mechanism with a suitable source of power supply as to co-ordinate its movements.

Many other important advantages and objects will appear from the following description, appended claims, and accompanying drawings, in which:

Fig. 3 is a fragmentary plan of a mold carrier.

Fig. 4 is a perspective partly broken away showing one of the stirring elements.

Fig. 5 is a perspective partly broken away showing a second stirring element.

Fig. 6 is a vertical sectional view through my machine.

Fig. 7 is a vertical sectional view taken on line 7—7 of Fig. 6.

Fig. 8 is an end elevation of my machine.

Fig. 9 is a cross-sectional view taken on line 9—9 of Fig. 8.

Fig. 10 is a perspective of one of the scraping members.

In molding candy nut confections it is desirable that the nut clusters be molded without appreciably breaking up the nuts contained therein, and it is essential that the conglomerate be thoroughly mixed and the molded confections turned out with rapidity. My improved machine is designed to accomplish such results.

Figure 1:
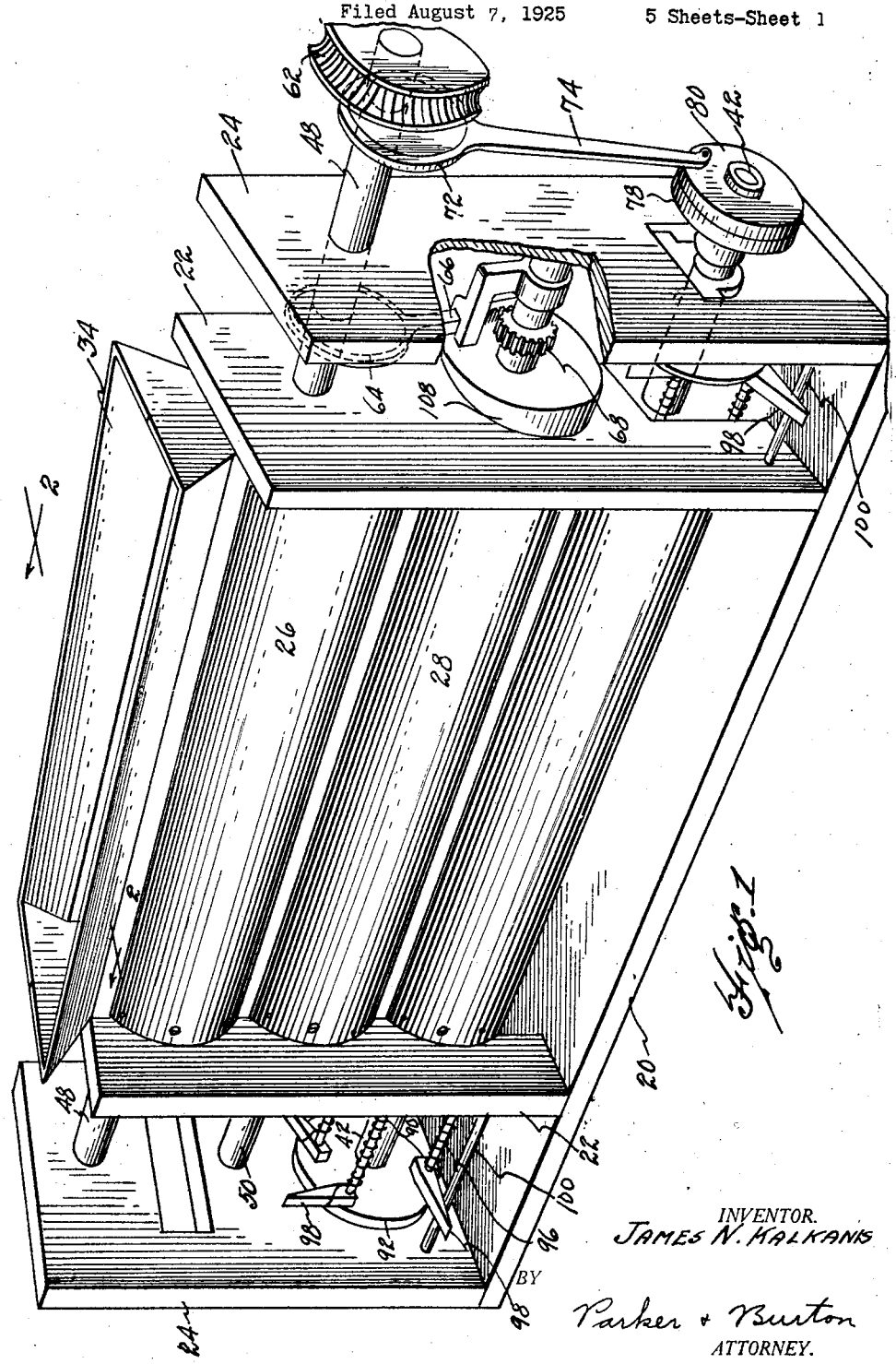
Figure 1 is a perspective of the main portion of my improved machine.

In Fig. 1, I show a frame 20 having upright standards 22 and 24 at each end. Between the upright standards 22 there are supported superimposed cylindrical receptacles 26 and 28 communicating with each other at their juncture, which passageway is controlled by a gate 30 provided with a handle 32 by means of which it may be withdrawn to open the communicating passageway to permit the contents of the chamber 26 to be discharged into the chamber 28. The chamber 26 is provided with a hopper 34. The chamber 28 has a discharge outlet 36 extending lengthwise the chamber.

Rotatably supported between the standards 22 below chamber 28 is a mold carrier 38 provided with successive series of mold cavities 40. The particular mold carrier shown in the drawing has four series of these mold cavities. This mold carrier is so disposed as to normally close the discharge opening 36 of the mixing chamber 28 and is mounted upon a shaft 42 which has a bearing in standards 22 and also 24.

Figure 2:
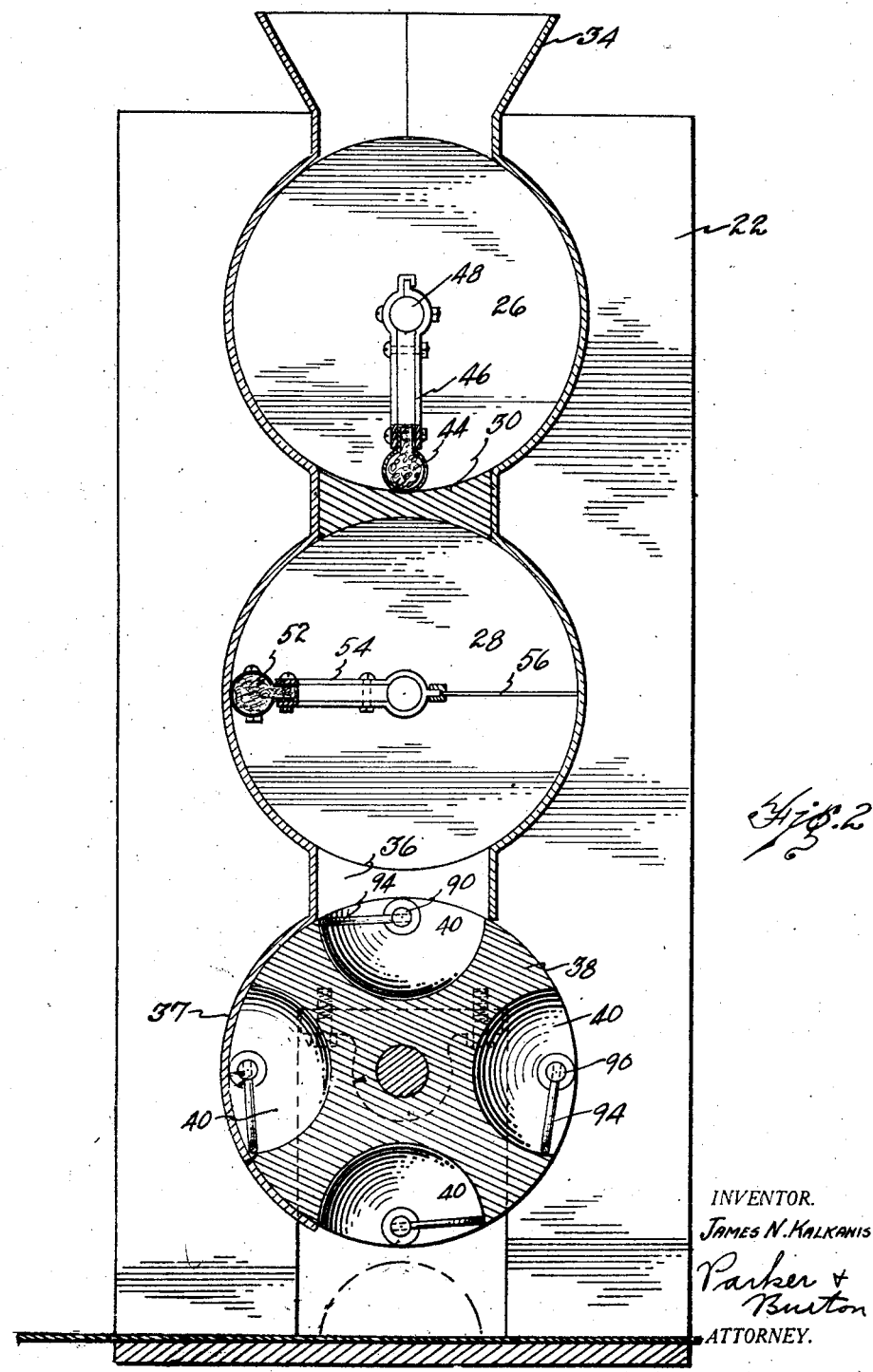
Fig. 2 is a cross-sectional view taken on line 2—2 of Fig. 1.

Mounted within the receiving chamber 26 is a rotatable stirring element provided with a scraper 44 of suitable flexible material, such as leather, held between a pair of frame members 46 which are carried by stub shaft ends 48. The construction of this stirring member appears most clearly in Figs. 2, 4 and 6. The flexible kneading roll 44 is adapted during the rotation of the stirring member to travel over the surface of the chamber and the flexibility of the roll prevents it from breaking up the nuts contained in the conglomerate.

There is mounted within the chamber 28 an agitating element carried by stub shafts 50. This agitating element comprises a flexible roll 52 carried by frame members 54 in the same manner as described with respect to the stirring element carried in the upper chamber, but the frame members 54 are provided with radially extending fingers 56 adapted to thoroughly mix the conglomerate contained within the chamber 28 during the rotatable oscillation of the agitating element. I have shown the stirring member and the agitating element as driven from a suitable source of power such as an electric motor 58 by means of a worm 60 meshing with a gear 62 which drives the shaft 48. Upon this shaft is mounted an eccentric 64 which has a rack arm 66 that engages a gear 68 carried by the shaft 50 to rotatably oscillate said shaft. A guide 70 is provided for the rack arm 66.

It will appear, therefore, that upon rotation of the shaft 48 to rotate the stirring element through the chamber 26 the shaft 50 will be rotated to oscillate the agitating element within the chamber 28. The connection of the agitating element with the rack arm is preferably such that the kneading roll 52 is oscillated along the wall of the chamber from one side of the discharge opening 36 to the other without traversing such discharge opening while the flexible fingers 56 do traverse the discharge opening.

The mold carrier 38 mounted upon the shaft 42 is driven off the shaft 48 by means of an eccentric 72 provided with an arm 74 adapted to actuate a ratchet member to interruptedly rotate the carrier in one direction.

This ratchet construction is such that the shaft 48 in making a complete revolution drives the carrier forwardly during one-half of this revolution while during the second half of the revolution the carrier remains stationary to receive or to discharge the contents of the mold cavities. The construction of the ratchet is conventional and is shown in Figs. 1, 7 and 9. The shaft 42 carries a ratchet gear 76 provided with internal teeth on each side projecting in opposite directions.

This gear is covered by casing members 78 and 80 rotatably supported upon the shaft 42. The cam arm 74 has a pin 75 extending through the casing member 80 and there is mounted upon the end of such pin a dog 82 held by a spring 84 against the ratchet teeth of member 76. As this cam arm travels downwardly the dog 82 rides over the teeth of the ratchet but as the cam arm comes up the dog picks up the ratchet gear 76 and rotates the shaft 42. The shaft 42 is then held by the dog 86 engaging in the teeth on the opposite side of the gear 76 being held therein by spring 87 at the position to which it has been rotated. This dog 86 is mounted upon a pin 88 that extends from the standard 24 through the casing member 78. To retain in shape the contents within the molds during the rotation of the mold carrier the casing wall 37 extends downwardly to one side of the mold carrier to that point at which the molded contents are discharged from the molds.

The mold carrier is provided with means to strip the molded contents from the molds which include a rod 90 extending lengthwise through the carrier for each series of molded cavities. There are four series of mold cavities and four of these rods. These rods 90 are carried by plates 92 mounted upon the shaft 42. Each rod is provided with a series of mold knives 94, one in each mold cavity. Each rod is held by means of a spring 96 under rotatable tension to retain the mold knives 94 at one side of the mold cavities. This spring is held at one end by the standard 22 and at the opposite end engages a tripping member 98 fixed to the rod. One of these springs is provided at each end of each rod and a tripping member 98 is fixed to each end of each rod. These tripping members during the rotation of the carrier are tripped by a stop 100 in the form of a rod so as to swing the knives 94 through the mold cavities to loosen the contents for discharge therefrom.

To prevent the collection of conglomerate within the discharge opening of the chamber 28 at the intervals between successive mold cavities, I provide a scraper comprising a series of scraper members 102 carried by stringers 104, disposed within the discharge outlet 36 from the mixing chamber 28. The scraper members 102 extend transversely and are held by the stringers 104 to be moved to scrape any conglomerate collecting at the interval into the adjacent mold cavities. The stringers 104 are held longitudinally by springs 106 toward a cam member 108 which is carried by shaft 50 so that the scrapers are actuated to perform their scraping function once during each rotation of the shaft 50.

The molded product may be dispensed upon any suitable receiving table but I have here shown an endless belt 110 traveling over pulleys 112, which belt is so disposed as to receive the molded product and move it to one side to permit of deposit of successive molded products. These belts may be driven by a gear 114, in turn driven by a gear 116 carried by a shaft 118 driven from the motor 58.

What I claim is:

1. In a machine of the class described, a receptacle for molten candy provided with a discharge opening, a rotatably supported mold carrier provided with a series of molds which upon rotation of the carrier are brought into position to receive the discharge of such receptacle and upon further rotation discharge the contents of the molds and a scraper mounted within the receptacle for oscillatory travel therethrough from one side of the discharge opening to the other without traversing the opening.

2. In a machine of the class described, a receptacle for molten candy provided with a discharge opening, a mold carrier disposed to close said discharge opening provided with a series of mold cavities which upon rotation of the carrier are brought into position to collect the contents of said receptacle discharged through the opening, and a mixing element having a scraper on one side and stirring fingers on the other side, which mixing element is mounted within the receptacle for rotatable oscillation.

3. In a machine of the class described, a receptacle for molten confection provided with a discharge opening, a rotatably supported mold carrier positioned below the receptacle provided with a series of molds which upon rotation of the carrier are brought into position to receive the contents of said receptacle discharged through said opening, and a cutting member within each mold, means to actuate said cutting member during the rotation of the carrier to swing said cutting member through the mold to loosen the contents thereof, said carrier adapted during its rotation to discharge the contents of the molds.

4. In a machine of the class described, a hopper adapted to receive a confection mixture and to serve as a mixing chamber therefor, an agitating element mounted therein, a receptacle positioned below the hopper and communicating therewith to receive the mixture therefrom and provided with a discharge opening therefor, an oscillating member positioned within said receptacle, a rotatably mounted mold carrier disposed below the discharge opening of the receptacle and provided with a series of mold cavities which during the rotation of the carrier are brought into position to catch the contents discharged from said receptacle, a casing about a portion of the rotatably mounted carrier to retain the conglomerate within the molds during the rotation of the carrier, said agitating element, oscillating member and mold carrier connected together for co-ordinated movement, and suitable power means connected therewith to actuate the same.

5. In a machine of the class described, a hopper adapted to receive a confection mixture and to serve as a mixing chamber therefor, an agitating element mounted therein, a receptacle positioned below the hopper and communicating therewith to receive the mixture therefrom and provided with a discharge opening therefor, an oscillating member positioned within said receptacle, a rotatably mounted mold carrier disposed below the discharge opening of the receptacle and provided with a series of mold cavities which during the rotation of the carrier are brought into position to catch the contents discharged from said receptacle, a casing about a portion of the rotatably mounted carrier to retain the conglomerate carried within the molds during the rotation of the carrier, a series of mold knives one within each mold so mounted as to be tripped during the rotation of the mold carrier to swing the mold knives through the molds to loosen the conglomerate therein for discharge therefrom, said carrier adapted to discharge the contents of the molds during the rotation of the carrier, and a movable table positioned underneath said carrier to receive the molded conglomerate discharged from the molds of the carrier.

6. In a machine of the class described, a mixing chamber adapted to contain molten confection provided with a discharge opening therefor, a scraper rotatably mounted within said chamber for rotatable oscillation to travel along the wall of said chamber from one side of said opening to the other, and a rotatably supported mold carrier below said chamber provided with a series of mold cavities which by rotation of the carrier are brought into position to collect the contents of said chamber and upon further rotation to discharge said contents in molded form.

7. In a machine of the class described, a cylindrical mixing chamber adapted to contain molten candy provided with an opening through which the same may be discharged, an agitating element mounted within the mixing chamber for rotatable oscillation provided with a flexible scraper adapted to travel over the wall of said mixing chamber, and a rotatably mounted carrier provided with a series of mold cavities which during the rotation of the carrier are brought into position to catch the contents of said mixing chamber discharged through its discharge opening.

8. In a machine of the class described, superimposed cylindrical chambers provided with a communicating passageway, the uppermost chamber having a hopper and adapted to contain molten candy, a stirring element mounted within said upper chamber, the lower chamber provided with a longitudinally extending discharge opening and adapted to receive the contents of said upper chamber, a rotatably supported mold carrier disposed below the discharge opening of said lower chamber provided with a successive series of mold cavities in its periphery which during the rotation of the carrier are brought into position to catch the discharge of said chamber, a casing about a portion of the rotatable carrier to retain the contents of the molds therein, a movable platform below the rotatable carrier, and an agitating element mounted within said lowermost chamber for rotatable oscillation, said stirring element, agitating element and rotatable carrier connected with a suitable source of power to be driven therefrom.

9. In a machine of the class described, superimposed cylindrical chambers provided with a communicating passageway, the uppermost chamber having a hopper and adapted to contain molten candy, a stirring element mounted within said upper chamber, the lower chamber provided with a longitudinally extending discharge opening and adapted to receive the contents of said upper chamber, a rotatably supported mold carrier disposed below the discharge opening of said lower chamber provided with successive series of mold cavities in its periphery which during the rotation of the carrier are brought into position to catch the discharge of said chamber, a casing about a portion of the rotatable carrier to retain the contents of the molds therein, a movable platform below the rotatable carrier, an agitating element mounted within said lower most chamber for rotatable oscillation, said agitating element having a flexible scraper adapted to contact the wall of the chamber and provided with mixing fingers, said agitating element so mounted and connected with a suitable source of power as to be rotatably oscillated to cause the scraper to travel over the wall of the chamber without traversing the opening thereof and to cause the fingers to travel through the chamber and across such opening.

10. In a machine of the class described superimposed cylindrical chambers provided with a controlled communicating passageway, the uppermost chamber having a hopper adapted to contain a molten confection, a stirring element mounted within said upper chamber, the lower chamber provided with a longitudinally extending discharge opening, a rotatably supported mold carrier mounted below said discharged opening to close the same provided with a successive series of mold cavities which during the rotation of the carrier are brought successively into position to receive the contents discharged through the opening of the lower chamber, a casing about a portion of the rotatable carrier to retain the contents of the molds therein, a series of scrapers mounted within said second chamber at the interval between the mold pockets movably supported to scrape the conglomerate at such intervals into the mold pockets, an agitating element mounted for rotatable oscillation within the lower chamber, mold knives one within each mold cavity mounted so as to be automatically tripped during the rotation of the mold carrier to swing the knives through the mold cavities to loosen the conglomerate therein for discharge therefrom, said carrier adapted during its rotation to discharge the molded conglomerate from the mold cavities.

11. In a machine of the class described, a mixing chamber having a hopper, a second chamber communicating therewith having a discharge opening, a mold carrier rotatably mounted below said discharge opening closing the same provided with a series of mold cavities which during the rotation of the carrier are brought into position below said opening to catch the discharge therethrough, means for rotating said mold carrier, a series of cutting knives one in each mold cavity held under spring tension and means to automatically trip said cutting knives during the rotation of the carrier to swing said knives through the cavity to loosen the molded conglomerate therein for discharge therefrom.

12. In a machine of the class described, a receptacle having a hopper, a mixing chamber communicating therewith provided with a discharge opening, a rotatably supported mold carrier mounted below said discharge opening provided with successive series of mold cavities which during the rotation of the carrier are brought into position to receive the contents discharged from the mixing chamber, an agitating member mounted for rotatable oscillation within said mixing chamber, stripping members one in each mold cavity means to automatically trip said stripping members during the rotation of the mold carrier to loosen the molded conglomerate within the molded cavities, said mold carrier, stripper and agitating element connected together and with a suitable source of power to be driven in co-ordination therefrom.

In testimony whereof, I sign this specification.

JAMES N. KALKANIS.